United States Patent [19]

Allen

[11] Patent Number: 5,253,277

[45] Date of Patent: Oct. 12, 1993

[54] VENT ASSEMBLY

[75] Inventor: Bruce F. Allen, Granby, Conn.

[73] Assignee: Combustion Engineering, Inc., Windsor, Conn.

[21] Appl. No.: 788,706

[22] Filed: Nov. 6, 1991

[51] Int. Cl.$^5$ .............................................. G21C 19/00
[52] U.S. Cl. .................................. 376/265; 376/264; 376/234
[58] Field of Search ...................... 376/264, 265, 234; 251/84, 221; 976/DIG. 126, DIG. 129

[56] References Cited

U.S. PATENT DOCUMENTS

| | | | | |
|---|---|---|---|---|
| 4,134,789 | 1/1979 | Aubert | .............................. | 376/262 |
| 4,468,000 | 8/1984 | Smith | .................................. | 251/84 |
| 4,752,434 | 6/1988 | Savary | .............................. | 376/233 |

Primary Examiner—Donald P. Walsh
Assistant Examiner—Meena Chelliah
Attorney, Agent, or Firm—John H. Mulholland

[57] ABSTRACT

A vent tube (66) and housing nut (62) replace the original housing plug (52) on a pressurized water nuclear reactor. The vent tube engages the installed vent stem (38) cross-slot (48) with a cross-shaped projection (70). During operation, the vent tube (66) is pushed down to engage the vent stem (38) and rotated to allow vented air to travel through stem (38) and tube (66). After venting, the vent stem is rotated back and tightened. The invention provides visual indication of a leaking ball (32) since any leakage lifts vent tube (66). Time required for venting is reduced and no removal of installed ball seal (32,34), a proven primary seal, is required.

6 Claims, 2 Drawing Sheets

VENT ASSEMBLY

BACKGROUND OF THE INVENTION

This invention relates to the field of nuclear reactors for nuclear steam supply systems and is particularly adapted for use in a pressured water reactor (PWR) having control rod drive mechanism upper pressure housings extending above the reactor closure head.

During a refueling or maintenance outage, the reactor vessel requires venting of air during reactor coolant filling and vessel pressurization. This is done through vents at the top of the control element drive mechanism (CEDM) upper pressure housings. The originally provided vent assembly for this purpose consists of a housing which includes a central passageway containing a flow blocking ball, and seat therefor, and an internally threaded portion downstream and outwardly therefrom. A vent stem with a mating externally threaded hollow body and with torquing pads formed by cross-slotting for engagement by a torquing tool on its downstream end is normally threadedly assembled to hold the ball against its seat to seal the housing passageway. An externally threaded housing closure plug closes the downstream portion of the housing passageway and encloses the downstream vent stem end.

It is important to vent properly after refueling to minimize the occurrence of stress corrosion cracking on the PWR control rod drive mechanism housing. Utilizing the prior art vent venting structure described above, however, requires about 20–30 minutes per drive mechanism, and involves disassembly of the ball seal housing to replace o-rings. During venting operations, the threaded plug is removed, a special vent stem hollow torquing tool inserted in the cross-slotting, and the vent stem unscrewed slightly to allow air to pass through the vent stem and up the tool. Afterward, the stem is tightened, the tool removed and the threaded plug reinstalled.

This standard venting process is very time consuming and creates significant manrem exposure during critical path restart activities. Also, the standard threaded plug has an affixed o-ring seal in case the operator wishes to weld the plug to the housing. If the ball (primary seal) is leaking, the o-ring (not intended to be a primary seal) may contain the leakage and it will not be realized that the primary seal is leaking.

SUMMARY OF THE INVENTION

The vent assembly of the instant invention provides a quick and easy venting operation which can be installed in minutes with no welding required while reducing manrem exposure.

The novel system replaces the prior art externally threaded closure with an assembly which includes a housing nut having a central passageway with a vent tube slidable therein and a shutoff valve connector in communication with said vent tube at its end remote from the vent stem hollow body in communication with flow between the ball and seat. The shutoff valve connector is normally closed to flow but open to flow upon attachment of an elongated conduit thereto by means of a mating connector stem.

The central passageway of the housing nut is a bore and the vent tube is slidingly mounted therein with the quick connect valve on the outer or downstream tube end. At the opposite or inner end of the vent tube, adjacent the downstream end of the vent stem, the vent tube has a projecting cross-shape which mates with the cross-slots on the downstream end of the vent stem such that during operation, the vent tube is pushed down to engage the vent stem and rotated to threadedly move the vent stem to allow vented air to travel past the thus released ball and seat, through the vent stem and through the vent tube which is in communication therewith and with the shutoff valve connector.

The vent tube has o-rings providing a sliding seal between it and the housing passageway bore such that any leakage past the ball will raise the vent tube, i.e., move it outwardly and downstream, thus indicating such leakage.

DETAILED DESCRIPTION OF THE INVENTION

Figure 1:
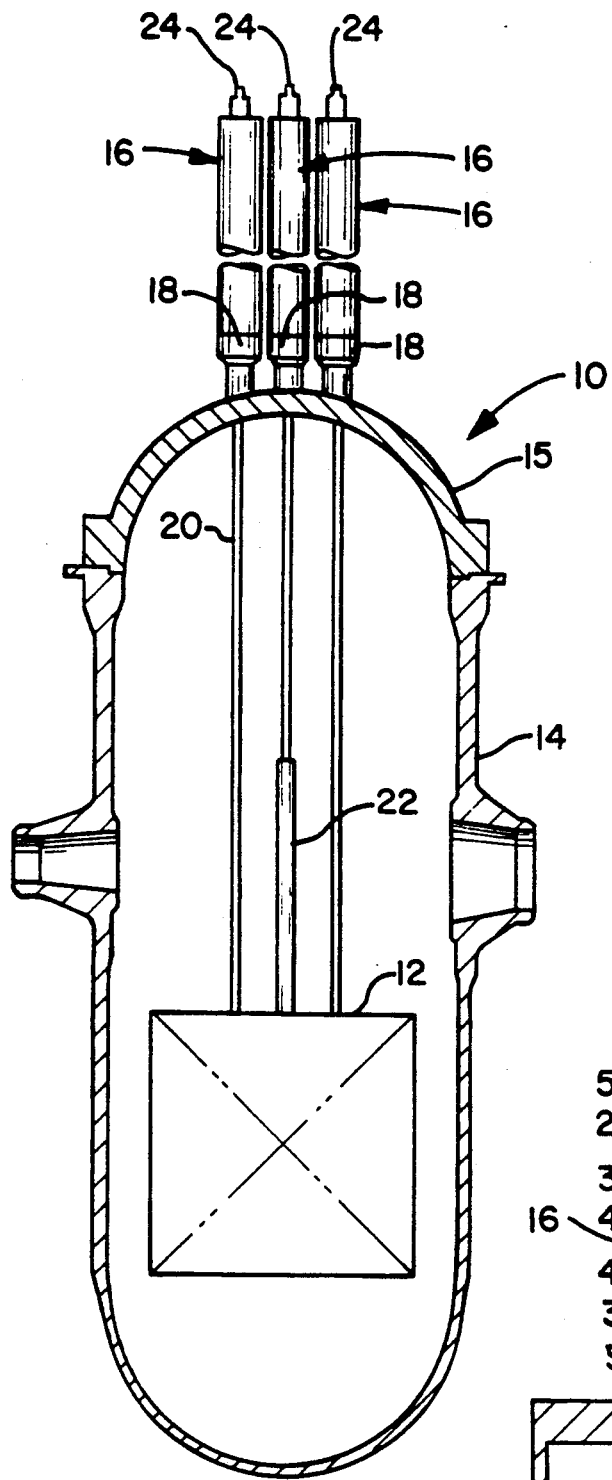
FIG. 1 is an elevational schematic cross-sectional view of a pressurized water nuclear reactor with a reactor vessel head having control element drive mechanism upper pressure housings extending above the reactor closure head.

The numeral 10 generally designates a pressurized water reactor of a nuclear steam supply system having a core 12, a vessel 14 and a reactor closure head 15. Control element or rod drive mechanisms, generally designated 16, are attached to head penetrating nozzles 18 and extend above closure head 15 and are connected by elongated elements 20 to control rods 22 which are vertically movable into and out of core 12 for control of the fission reaction.

Each control element drive mechanism (CEDM) 16 includes an upper pressure housing 24 within an upper pressure housing shroud 26. As seen, for example, in prior art FIG. 2, the upper pressure housing 24 includes a central passageway 30, a flow blocking valving ball 32 and a ball seat 34. The passageway 30 includes an enlarged internally threaded portion 36 downstream (upwardly) and outwardly of the valve formed by ball 30 and seat 32. A mating externally threaded vent stem 38 is threadedly received in threaded portion 36 and holds the ball 30 against seat 32 in a normally flow closed position.

The vent stem 38 has a hollow upper body within the passageway enlarged threaded portion 36 and a reduced diameter end portion 40 in passageway 30 between the hollow body and the ball 32 around which flow past the ball can travel to enlarged portion 36. Once flow has reached enlarged portion 36 at the lower end 42 thereof, it enters a diamentral flow passage 44 and thence outwardly through axial passage 46 to the end of the vent stem 38 remote from ball 30. Torquing pads 48 are formed by cross-slot 50 at the outer end of axial flow passage 46 of vent stem 38. An externally threaded housing closure plug 52 closes the downstream end portion 54 of enlarged threaded portion 36 of housing passageway 30 in the FIG. 2 prior art arrangement.

Figure 2:
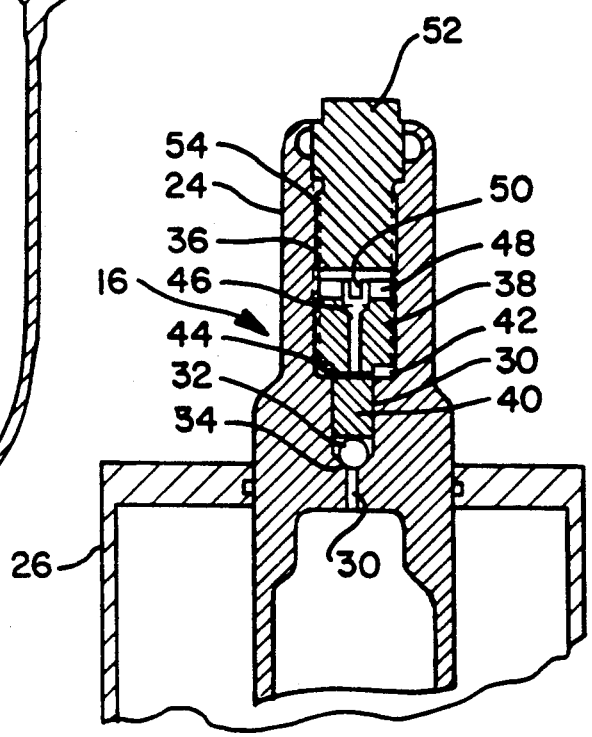
FIG. 2 is an enlarged elevational fragmentary schematic cross-sectional view of the prior art vent assembly for mounting in the nuclear reactor vessel control element drive mechanism upper pressure housings to vent air during filling and pressurizing the vessel.
Figure 3:
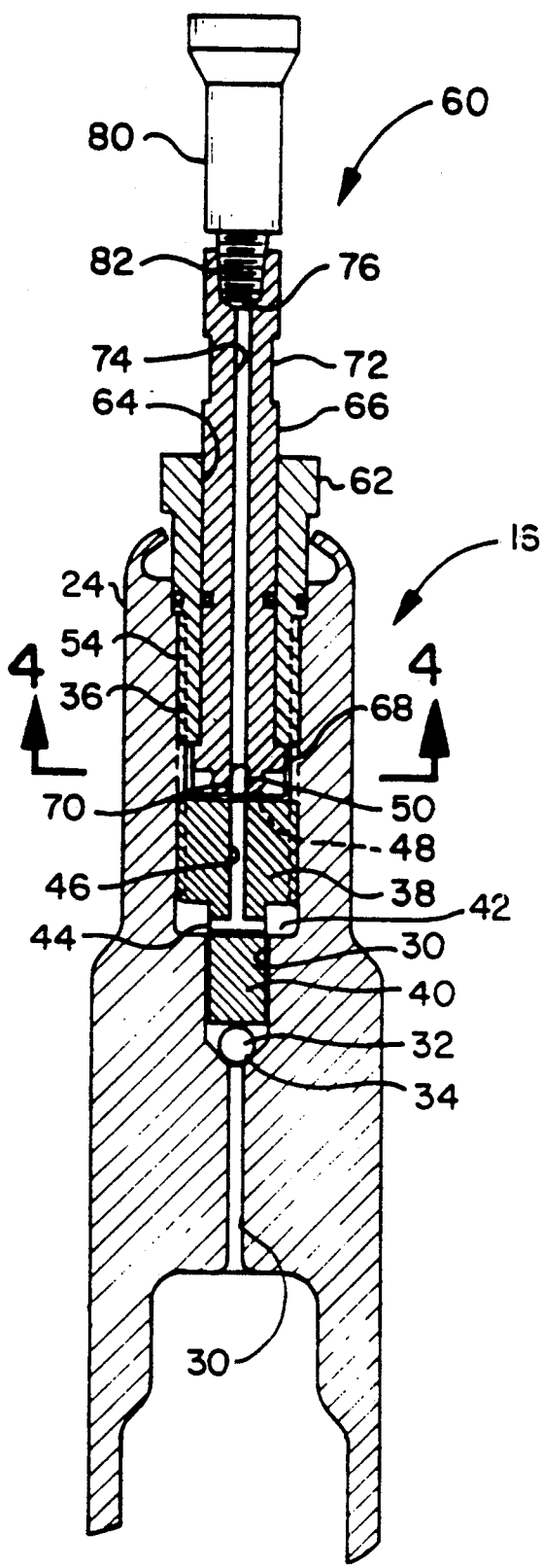
FIG. 3 is an elevational fragmentary schematic cross-sectional view of the novel vent assembly for replacement of the prior art vent of FIG. 2.
Figure 4:
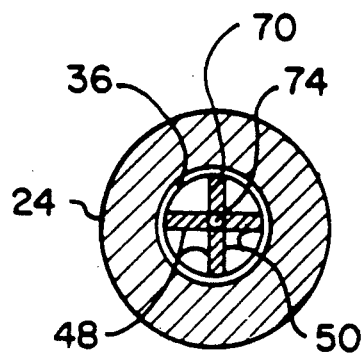
FIG. 4 is a cross-sectional view taken along the line 4—4 of FIG. 3.

The novel arrangement of FIGS. 3 and 4 are provided after removal of the prior art externally threaded housing closure plug 52 shown in FIG. 2 and the substitution therefor of a novel externally threaded housing closure vent assembly, generally designated by the numeral 60, which simplifies venting of the reactor 10 during coolant filling and vessel pressurization. Like parts of the prior art arrangement of FIG. 2, to the extent they remain in the novel arrangement of FIGS. 3 and 4, have like numerals.

The vent assembly 60 includes a hollow housing nut 62 having a central passageway in the form of a bore 64 in which vent tube 66 is slidably mounted for outward movement in case of leakage by ball 32. An o-ring 68 provides a sliding seal between the bore 64 and a vent tube 66. Movement outward provides a visual indication of a leaking ball since any leakage would cause the vent tube to so move.

The vent tube 66 at its end 68 adjacent the cross-slot 50 at the downstream end of vent stem 38 has a projecting cross-shape 70 which mates with the cross-slot 50 on the downstream end of the vent stem 38 such that during operation, the vent tube is pushed down to engage the vent stem torquing pads 48. Rotation of the vent tube 66, by engagement at tool pads 72 with a torquing tool, for instance, turns stem 38 because of the projecting cross-shape 70 and torquing pads 48 of vent stem 38 formed by cross-slot 50. This allows vented air to travel past the thus released ball 32 and seat 34, through vent stem passage 30 along reduced diameter end portion 40 and into passageways 44 and 46 of the body of vent stem 38. The vented air then passes through the central opening 74 in vent tube 66 to internally threaded end 76 thereof.

A shutoff valve connector 80 in the form of a quick connect valve with male fitting threads 82 is threaded connected to threaded end 76 of vent tube 66. The quick connect valve is sold by SWAGELOK Quick-Connect Co., Hudson, Ohio 44236 as Model QC-4-B-2PM. Mating stem fittings (now shown) from the catalog of that company designated QC-590-1 and dated May, 1990 provide the complete quick disconnect function for an elongated conduit or vent hose connection.

Thus, it will be seen that a rapid reactor cold venting system which saves precious critical path outage time, reduces manrem exposure and is not part of the reactor pressure boundary has been devised. The system consists of a vent tube and quick disconnect which replaces the presently installed housing nut in the top of the CEDM upper pressure housing. Installation consists of removing the original equipment manufacturer's housing plug or nut and screwing in the novel vent assembly, a process which takes about ten minutes per unit. The assembly remains installed during reactor operations, thereby eliminating the need to install and remove the usual vent tool for venting. The system also provides a visual indication in the event of ball seal leakage and can be easily removed and replaced by the original plug, if desired for welding.

I claim:

1. A vent assembly for mounting in a nuclear reactor vessel control element drive mechanism upper pressure housing to vent air during filling and pressurization of the vessel, which housing includes a central passageway containing a flow blocking ball and seat therefor, an internally threaded passageway portion downstream and outwardly therefrom into which a vent stem with a mating externally threaded hollow stem body and with torquing pads on a downstream end thereof is threadedly assembled to hold the ball in the seat of the housing, and an externally threaded housing closure for closing the downstream portion and enclosing the downstream stem end, said vent assembly characterized in that:

the externally threaded housing closure is a vent assembly which comprises:

a hollow housing nut threadedly received in the upper downstream pressure housing central passageway;

a vent tube mounted in a central passageway of the hollow housing nut;

a shutoff valve connector in communication with the vent tube downstream from the vent stem hollow body which is in communication with flow between the ball and seat, said shutoff valve connector being normally closed to flow but automatically open to flow upon connection of an elongated conduit thereto.

2. The vent assembly of claim 1 in which the shutoff valve connector is a quick connect valve.

3. The vent assembly of claim 1 in which the hollow housing nut central passageway includes a bore with the vent tube slidingly mounted therein and said quick connect valve is mounted on the end of said vent tube.

4. The vent assembly of claim 3 in which the torquing pads are defined by cross-slots on the downstream end of the vent stem.

5. The vent assembly of claim 4 in which the end of the vent tube adjacent the downstream cross-slotted end of the vent stem has a projecting cross-shape which mates with the cross-slot on the downstream end of the vent stem such that during operation, the vent tube is pushed down to engage the vent stem and rotated to threadedly move the vent stem to allow vented air to travel past the thus released ball and seat, through the vent stem and through the vent tube which is in communication therewith and with the shutoff valve connector.

6. The vent assembly of claim 3 in which an o-ring provides a sliding seal between the vent tube and the hollow housing nut passageway bore and any leakage past the ball will move the vent tube outwardly, thus indicating such leakage.

* * * * *